Oct. 8, 1940.　　　C. W. FLOSS　　　2,217,048
MAGNETIC WORK HOLDER
Filed Nov. 26, 1937　　　2 Sheets-Sheet 1
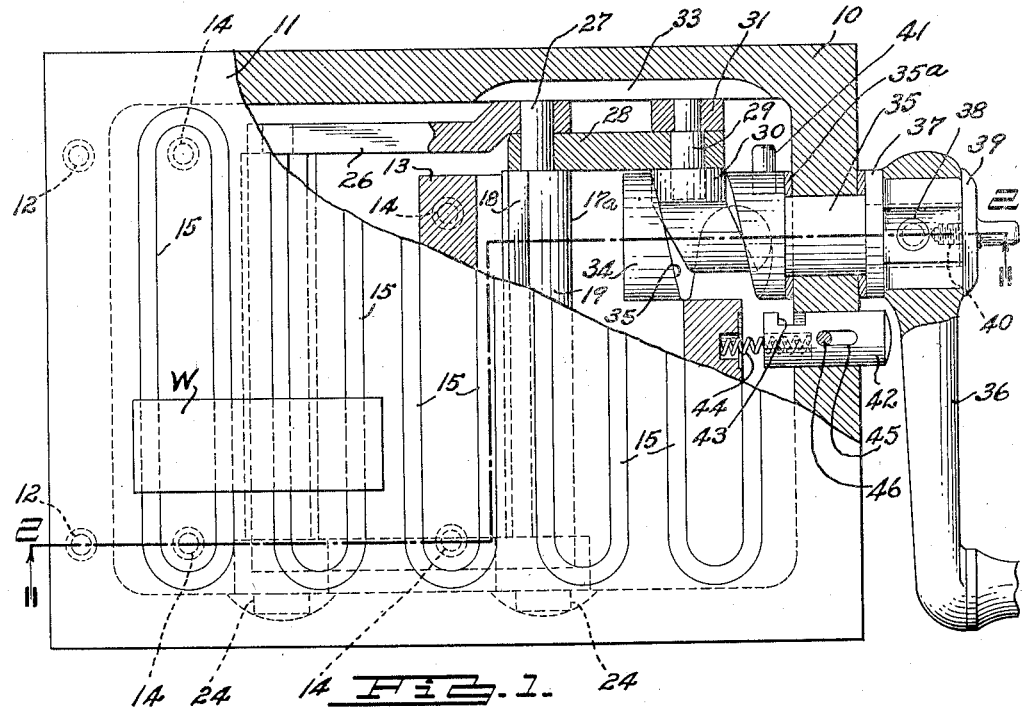
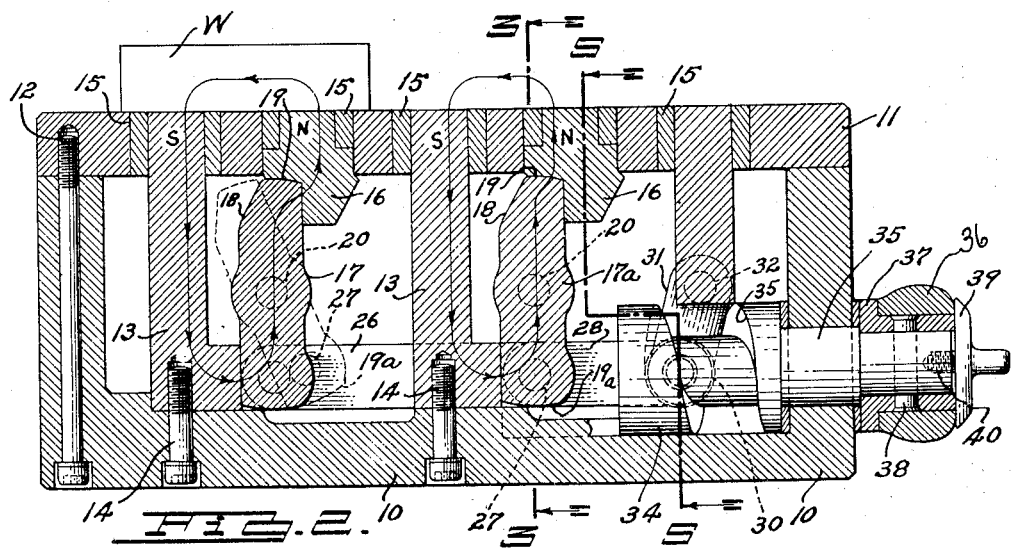
INVENTOR.
Carl W. Floss
BY Edward M. Apple
ATTORNEY.

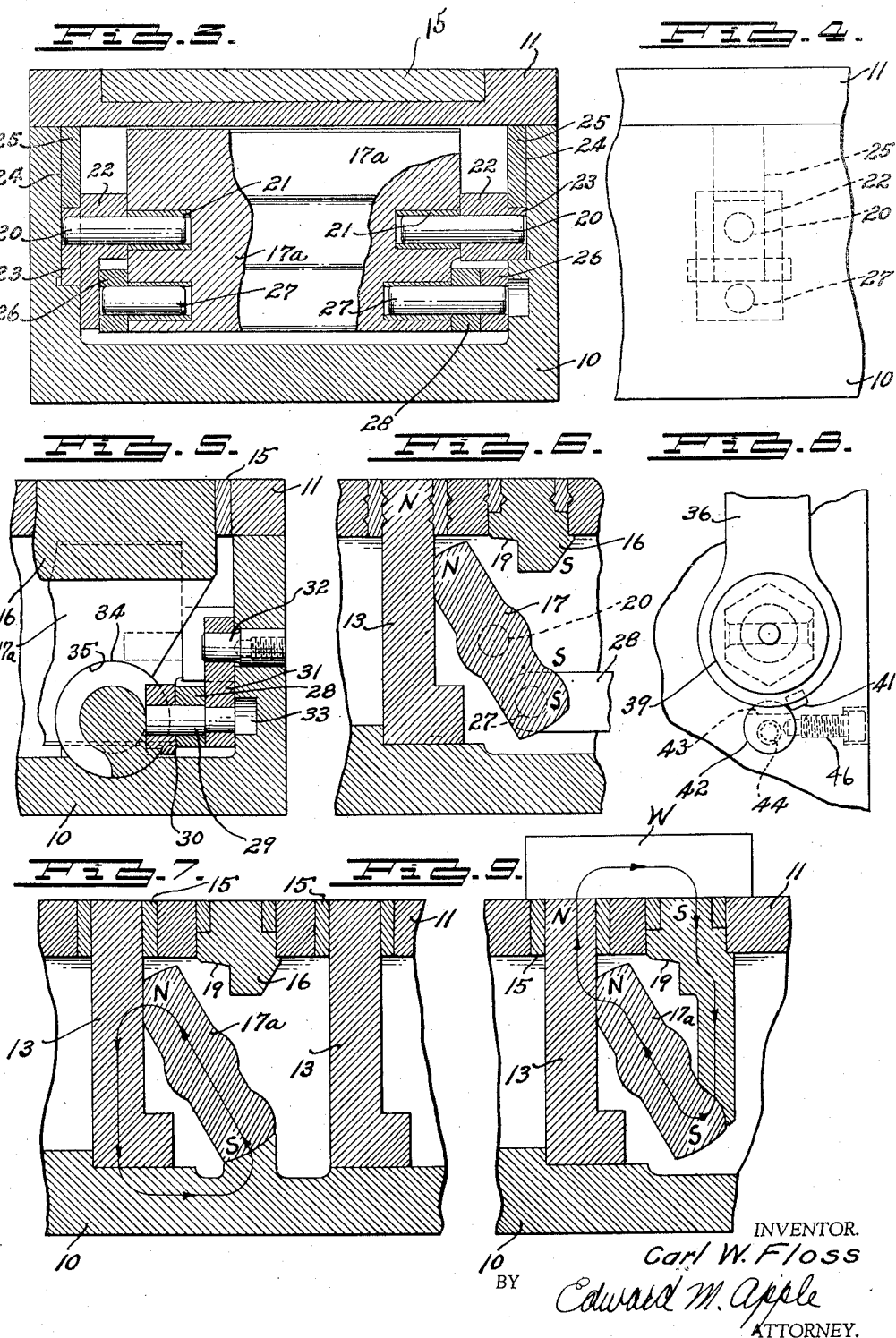

Patented Oct. 8, 1940

2,217,048

UNITED STATES PATENT OFFICE 2,217,048

MAGNETIC WORK HOLDER

Carl W. Floss, Detroit, Mich., assignor to Robbins Engineering Company, Detroit, Mich., a corporation of Michigan Application November 26, 1937, Serial No. 176,578

7 Claims. (Cl. 175—367)

This invention relates to magnetic work holders and has particular reference to magnetic chucks employing permanent magnets.

An object of the invention is to generally improve the construction and operation of magnetic work holders to the end that many of the difficulties now encountered in the use of such devices may be obviated.

Another object of the invention is the provision of a device of the character referred to in which the magnetic flux can be properly controlled to facilitate the removal of the work from the holder.

A further object of the invention is the provision of a device of the character indicated, in which the magnets may be readily shifted without danger of causing wear between the magnets and the work table. In present known devices of this kind, the wear occasioned by shifting the magnets increases the clearance between the magnets and the table, thereby causing detrimental deflection of the working surface. This is particularly noticeable in chucks of larger size.

A still further object of the invention is the provision of a magnetic work holder in which the work may be either partially or entirely demagnetized while on the work table.

Another object of the invention is the provision of a device of the character described in which the polarity of the magnets may be readily reversed while the work is on the table, thereby creating a temporary condition in the work piece wherein similar poles are adjacent one another, which results in a repelling action having a tendency to cause the work to be released forcibly from the table.

Another object of the invention is the provision of a magnetic work holder in which the magnetic flux may be entirely directed through the base of the holder.

A further object of the invention is the provision of a magnetic work holder, which is constructed so that there is a minimum of leakage of magnetic flux away from the work when the work is to be held, but arranged so that a variable and complete resistance to the flow of flux through the work may be introduced.

Another object of the invention is the provision of a magnetic work holder having means for lubricating the working parts.

An advantageous feature of my invention is that there are no air gaps in the system when the work is being held and when the work is to be released, a cam arrangement giving a large ratio of resistance to effort, enables the flux circuit to be broken with a relatively small effort. The flux lines are not broken completely at first, but continue to travel through a very small air gap and finally a large air gap brings down the flux to a point where the work can be readily removed. This is based on the well-known relation that the total flux in a magnetic circuit is equal to the magnetomotive force divided by the reluctance. Since the magnetomotive force of a permanent magnet is substantially constant, the means of reducing the flux is to increase the reluctance or magnetic resistance of the circuit. In this case, this is accomplished by introducing a variable air gap.

If it is desired to demagnetize the work, a further continued movement of the magnet contacts the opposite pole to reverse the polarity, this tending to demagnetize the work in an entirely new way for this type of chuck, and by a relatively simple manner. To insure a true work surface at all times, some of the pole pieces tie the face plate to the base, thus practically eliminating the possibility of deflection, even in very large chucks or devices of this kind.

At no point in the magnetic circuit itself is there any wear since there is no relative sliding, but since there are pivot points, not affecting the magnetic circuit, that control the movement of the magnets, it is desirable to lubricate these points. In fact, it is desirable to lubricate relatively moving magnets in all types using preferably thin oils. The casing should be moisture-proof to keep foreign matter out of the interior, and it is only necessary to introduce a small quantity of oil during manufacture and no further attention need be given it.

In order to produce more complete demagnetization, a modified form of structure is proposed in which a complete circuit is formed in the reverse direction. Another modification provides for completely shunting the entire flux through the base of the device, thus relieving the face plate completely.

The foregoing objects and other advantages of the invention will be more readily understood as the description proceeds, reference being made to the accompanying drawings wherein:

Fig. 1 is a plan view, partly in section, of a device embodying my invention.

Fig. 2 is a longitudinal section taken on line 2—2 of Fig. 1.

Fig. 3 is a transverse section through one of the permanent magnets on line 3—3 of Fig. 2.

Fig. 4 is a side view of Fig. 3, illustrating the manner of holding the magnetic pivots in position.

Fig. 5 is a section taken on line 5—5 of Fig. 2.

Fig. 6 is a fragmentary section of a modified form of my device arranged to provide partial demagnetization by reversing the flux from its original direction through the work, while, at the same time, maintaining an air gap in part of the circuit.

Fig. 7 is a further modified form illustrating the manner in which the flux may be entirely short-circuited through the base of the device.

Fig. 8 is a fragmentary end view showing the relation of the stop plunger for controlling the movement of the cam in the demagnetization operation.

Fig. 9 is a fragmentary sectional view of a modified form of my device illustrating the manner in which I effect a complete demagnetization by reversing the flux and closing the air gap shown in Fig. 6.

Referring now more particularly to the drawings, it will be seen that in the preferred embodiment of my invention I provide a base or housing 10, which preferably may be made of a single piece of magnetic material machined out to form a substantially hollow rectangle in which are mounted, as hereinafter explained, the magnets and moving parts of my device. The housing 10 is enclosed by means of the work plate 11, which is made of non-magnetic material and which is secured to the housing 10 by means of tie bolts 12. A plurality of pole pieces 13 are mounted on the inside of the housing 10 and secured to the base thereof by means of machine screws 14. The pole pieces 13 are of sufficient length to extend through apertures formed in the work plate 11 and are sealed in said apertures by means of non-magnetic material 15, which may consist of Babbitt or expansion metal. Shorter pole pieces 16 are press-fitted into apertures formed in the work plate 11 and are also sealed by a non-magnetic material 15. A plurality of permanent magnets 17 and 17a are pivotally mounted as hereinafter described, within the housing 10. The permanent magnets 17 and 17a are formed with cross-sections substantially as shown in Fig. 2, and are provided with angular faces 18 at opposite ends with curved surfaces 19 and 19a respectively, said curved surfaces 19 being arranged to contact correspondingly curved surfaces formed in the pole pieces 16. The lower front and upper back surfaces of the magnets 17 and 17a are also machined to engage correspondingly machined faces formed on the pole pieces 13 and 16 respectively, so that close contact may be had between the magnets and said pole pieces.

The magnets 17 and 17a are mounted on pivots 20, Fig. 3. Because of the particular hardness of the permanent magnets 17 and 17a, I prefer to insert the pivots 20 in bushings 21 in order to permit accurate sizing. The pivots 20 are supported by inserts 22 which are provided with shoulders 23, which are arranged to engage vertical slots 24 formed in the sidewalls of the housing 10. Keys 25 are arranged to engage the slots 24 between the inserts 22 and the work table 11, and are adapted to maintain the inserts 22 in their proper position. A link 26 is pivoted as at 27 adjacent the lower ends of the magnets 17 and 17a. A second link 28 connects the magnet 17a (Fig. 2) to a pivot 29 upon the end of which is mounted a roller 30. A third link 31 is pivoted at one end to the pivot 29 and at the other end on a pivot member 32, secured in a side wall of the housing 10. This link serves to maintain the roller in a vertical position. The links are of non-magnetic material so as not to affect the flow of the flux.

A clearance slot 33 is machined in the sidewall of the housing 10 to provide proper clearance for the working parts and to cut down the leakage of magnetic flux from the magnets to the housing 10.

A cam 34 is provided with a cam slot 35 adapted to engage the roller 30.

The cam 34 is provided with a shaft 35 which extends through the sidewall of the housing 10 and is adapted to support the crank 36, as hereinafter described. Thrust bearings 35a are mounted on the shaft 35 at opposite sides of the endwall of the housing 10.

A collar 37 is secured to the end of the shaft 35 by means of a pin 38. The collar 37 is preferably formed with a hexagonal outer periphery adapted to engage a hexagonal opening in the head of the crank 36. A locking member 39, having an externally threaded extension 40, is arranged to engage an internally threaded opening formed in the end of the shaft 35 to secure the crank 36 in position.

The cam 34 is provided with a pin 41 which is adapted to contact a plunger 42 slidably mounted in the endwall of the housing 10. The plunger 42 is intended to limit the movement of the cam 34 so that in turn the movement of the magnets 17 and 17a can be arrested in the position illustrated by the dotted lines in Fig. 2. The plunger 42 is provided with a transverse groove 43 which is arranged to permit the pin 41 to clear the plunger 42 when the latter is depressed against the compression spring 44. The plunger 42 is provided with an elongated transverse slot 45, which engages pin 46 mounted in the endwall of the housing 10.

In order to rock the magnets 17 and 17a on their respective pivots, it is only necessary to rotate the crank 36, which in turn causes the cam 34 to rotate. Upon rotation of the cam 34, the roller 30 travels in the cam slot 35, causing longitudinal movement of the links 26 and 28, which in turn cause the movement of the magnets.

In the drawings (Figs. 1 and 2) the letter w indicates a piece of work desired to be held upon the device. As illustrated in Fig. 2, when the magnets 17 and 17a are in a vertical position, the flow of the magnetic force will be in the direction indicated by the arrows through the pole pieces to the surface holding the work in place on the plate 11. When it is desired to shift or remove the work from the plate 11, the magnets 17 and 17a may be rocked on their respective pivots by means of a handle 36 and cam 34 and their connecting parts, as described aforesaid. It will be noted that in shifting the magnets in this manner, the lines of magnetic force will continue to flow in the same direction, but with diminished effect. With the cam mechanism herein disclosed, the work of breaking the lines of magnetic force is gradual, consequently it does not take the initial strong effort to break away the magnets, as in devices known heretofore. As the upper ends of the magnets 17 and 17a are moved toward the pole pieces 13, air gaps of increasing size are created between the upper ends of the magnets and the pole pieces 16. The air gap thus developed interposes a strong resistance in the magnetic circuit, thereby greatly reducing the flow of the lines of magnetic force. It is evident that with this arrangement a variable resistance is interposed in the magnetic circuit, thereby reducing the flow of the lines of force and enabling the work to be removed from the table 11.

If it is desired to completely demagnetize the work on the table 11, the plunger 42 is depressed, thereby permitting the cam 34 to rotate farther, whereupon the magnets are caused to swing into a position wherein the angular faces 18 come in actual contact with the pole pieces 13, as shown in Fig. 6, thus reversing the polarity which tends to temporarily demagnetize the work. In changing the polarity as hereinabove just described, a temporary condition is created in the work where we bring about the proximity of a north pole to what was formerly a south pole, thereby tending to produce a repulsion effect in the work on the chuck, thus facilitating its removal. This creates a repelling action which tends to forcibly break the work from the table 11. This is a novel feature of my invention.

In Fig. 7 I have shown a modified form of my invention illustrating the manner in which the magnetic circuit may be shunted completely through the base of the chuck, again providing means for completely demagnetizing the work on the table 11.

In Fig. 9 I have shown a further modification illustrating the manner in which the polarity of the device may be changed, and in addition thereto, completely eliminating the resistance to the magnetic circuit which is caused by the air gap which exists in the structure illustrated in Fig. 6.

To insure a true work surface at all times, in my device the pole pieces 13 are arranged to tie the face plate 11 to the base 10. This practically eliminates the possibility of deflecting the working surface of the table even in chucks of extremely large sizes.

At no point in the magnetic circuit itself is there any wear, since there is no relative sliding, as is the case in devices heretofore known. It is desired, however, that lubrication be proivded for the working parts, therefore, in order to lubricate the working parts of my device, I prefer to make my housing moisture-proof and when the device is assembled, I introduce a small quantity of oil to the bottom of the housing, relying on capillary action to get sufficient oil for lubrication purposes into moving parts.

Having described my invention, what I claim and desire to secure by Letters Patent is:

1. A magnetic work holder comprising a base and a non-magnetic work-supporting table, there being a plurality of comparatively short pole pieces of magnetic material positioned in said table, a plurality of longer pole pieces of magnetic material extending from the upper surface of said table to said base and arranged to help support said table, and a plurality of permanent magnets rockingly mounted beneath said table, each magnet being arranged to normally contact one long pole piece and one short pole piece to effect a magnetic circuit, and means for introducing variable resistances in said magnetic circuits.

2. A magnetic work holder comprising a base and a non-magnetic work-supporting table, there being a plurality of comparatively short pole pieces of magnetic material positioned in said table, a plurality of longer pole pieces of magnetic material extending from the upper surface of said table to said base and arranged to help support said table, and a plurality of permanent magnets rockingly mounted beneath said table, each magnet being arranged to normally contact one long pole piece and one short pole piece, to effect a magnetic circuit, and means for creating variable resistances in said magnetic circuits and changing the polarity of said pole pieces by the movement of said magnets.

3. In a device of the character described, including a magnetic base and a non-magnetic work table, the combination of a plurality of short pole pieces in said base and said table, the pole pieces of said table being insulated from said table, a plurality of long pole pieces extending from said base through said table and being insulated from said table, and a plurality of permanent magnets pivotably mounted and arranged, when moved in one direction to contact said long pole pieces and the short pole pieces of said table, and when moved in the other direction to contact said long pole pieces and the short pole pieces of said base.

4. The combination as defined in claim 1, there being links pivoted to said magnets and cam means for actuating said links, whereby said magnets may be rocked simultaneously.

5. The combination as defined in claim 1, there being links pivoted to said magnets, a roller pivoted to one of said links, a cam to actuate said roller, and means to manually rotate said cam, whereby said magnets can be rocked simultaneously.

6. The combination defined in claim 1, there being links connecting the magnets in a train, a link arranged to move said train, a roller on said last named link, a cam to actuate said roller, a crank to actuate said cam, and means arranged to limit the movement of said cam.

7. A magnetic chuck comprising two pole elements for supporting work, and a permanent magnet movable to one position for connection of its poles with both said pole elements whereby to form a closed magnetic flow circuit for including the work and causing attraction of the work to the pole elements, said magnet being adjustable to another position for disconnection of its poles from both pole elements and for connection of only one of its poles with one of said pole elements to cause polarity in said pole element adjacent to the work for repelling the work.

CARL W. FLOSS.